United States Patent [19]

Antl et al.

[11] Patent Number: 4,569,125
[45] Date of Patent: Feb. 11, 1986

[54] WIRING ARRANGEMENT FOR AN ELECTRIC TOOL

[75] Inventors: Jürgen Antl, Idstein; Willi J. Schmidt, Taunusstein; Hartmut Wredenhagen, Idstein, all of Fed. Rep. of Germany

[73] Assignee: Black & Decker Inc., Newark, Del.

[21] Appl. No.: 543,138

[22] Filed: Oct. 18, 1983

[30] Foreign Application Priority Data

Oct. 21, 1982 [DE] Fed. Rep. of Germany ....... 3239238

[51] Int. Cl.⁴ ............................................ H02K 15/04
[52] U.S. Cl. ....................................... 29/596; 29/469;
29/DIG. 3; 310/50; 310/71
[58] Field of Search .............. 29/596, 792, 469, 469.5,
29/525, 521, DIG. 3; 310/71, 42, 47, 50

[56] References Cited

U.S. PATENT DOCUMENTS

| 2,763,802 | 9/1956 | Dolan | 310/50 X |
| 3,440,592 | 4/1969 | Zelle | 310/71 X |
| 4,314,170 | 2/1982 | Sahrbacker | 310/71 X |
| 4,442,366 | 4/1984 | Cuneo | 310/71 X |

FOREIGN PATENT DOCUMENTS

| 0029328 | 5/1981 | European Pat. Off. . | |
| 524733 | 5/1931 | Fed. Rep. of Germany | 310/71 |
| 2155686 | 11/1971 | Fed. Rep. of Germany | 310/50 |
| 2631431 | 1/1978 | Fed. Rep. of Germany . | |
| 2745109 | 4/1979 | Fed. Rep. of Germany . | |
| 2824384 | 12/1979 | Fed. Rep. of Germany . | |
| 2853905 | 6/1980 | Fed. Rep. of Germany . | |
| 7803157 | 7/1980 | Fed. Rep. of Germany . | |
| 95957 | 6/1983 | Japan | 29/596 |
| 568679 | 10/1975 | Switzerland . | |
| 672690 | 7/1979 | U.S.S.R. | 310/71 |

Primary Examiner—Howard N. Goldberg
Assistant Examiner—Joseph M. Gorski
Attorney, Agent, or Firm—Ronald B. Sherer; Edward D. Murphy; Harold Weinstein

[57] ABSTRACT

A method of wiring an electric device, particularly an electric tool, comprises engaging conductor wires adjacent the ends thereof in bores and/or grooves provided in plastic carrier elements, with bared ends of at least some of the conductor wires protruding from these carrier elements. Then inserting the carrier elements, with the conductor wires engaged therein, into at least part of the housing of the electric device. And, electrically connecting the conductor wires by plugging carrier elements together and/or to an electrical component of the electric device, with said protruding bared ends functioning as plug pins. Preferably, the conductor wires each have a single solid conducting core having a cross-sectional area in the range of 1 to 5 mm. Such relatively rigid wires can be pre-shaped before insertion into a housing of the electric device. The rigidity of the wires, their pre-shaping, the carrier elements and the protruding bared ends of the wires enable the wiring of the device to be carried out mechanically.

16 Claims, 17 Drawing Figures

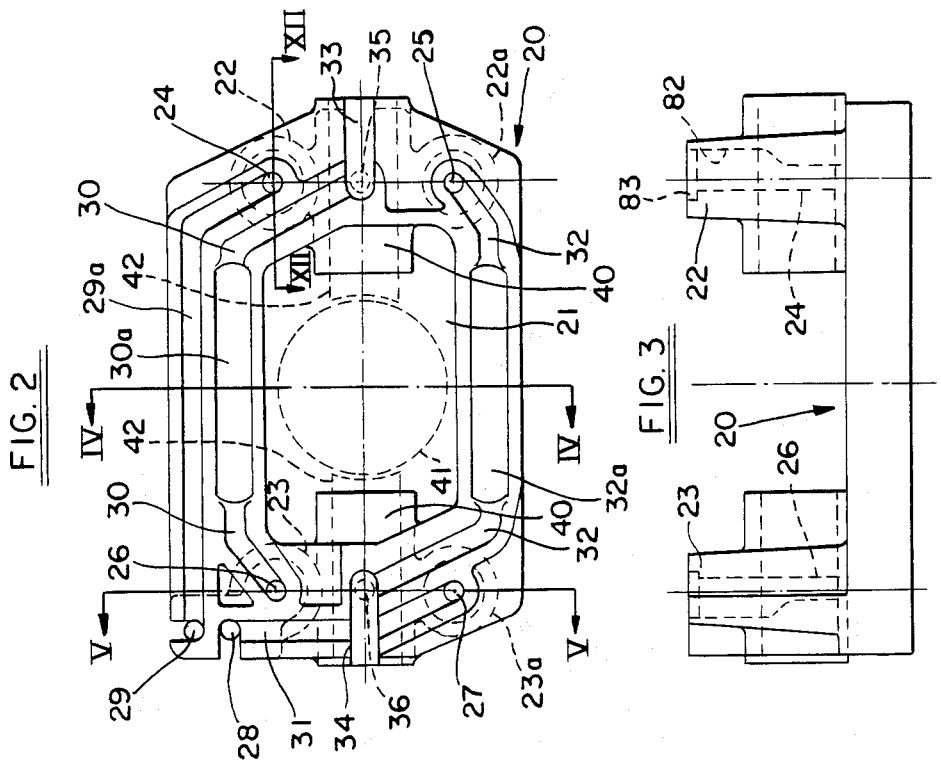
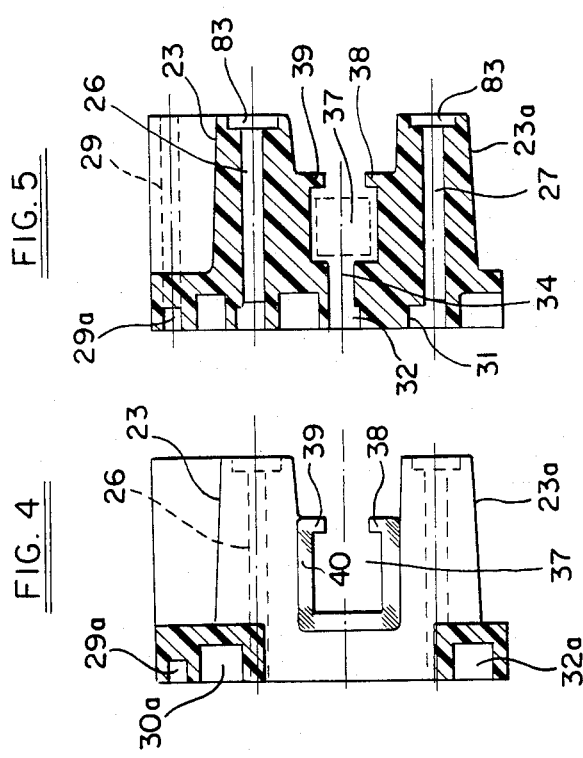

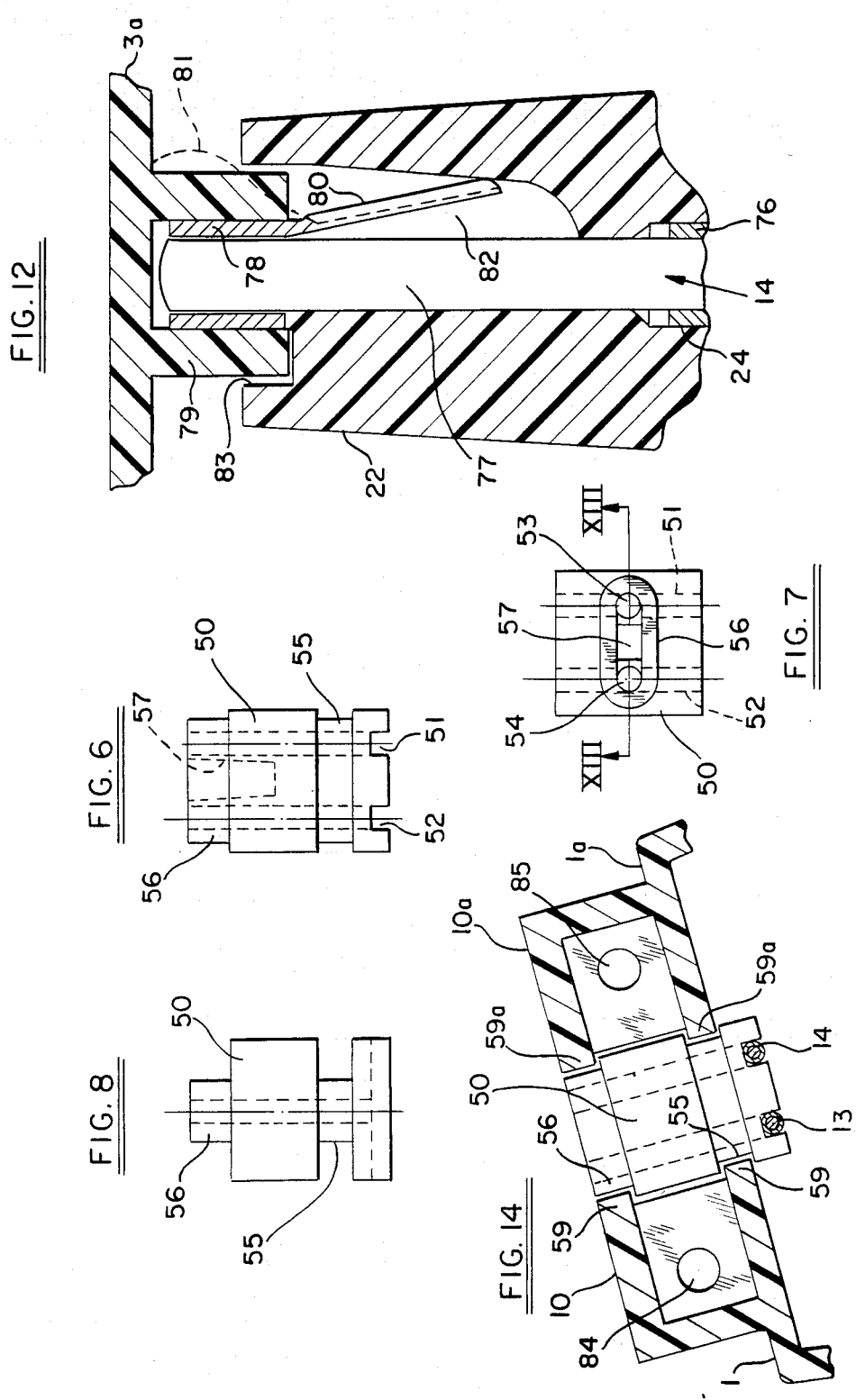

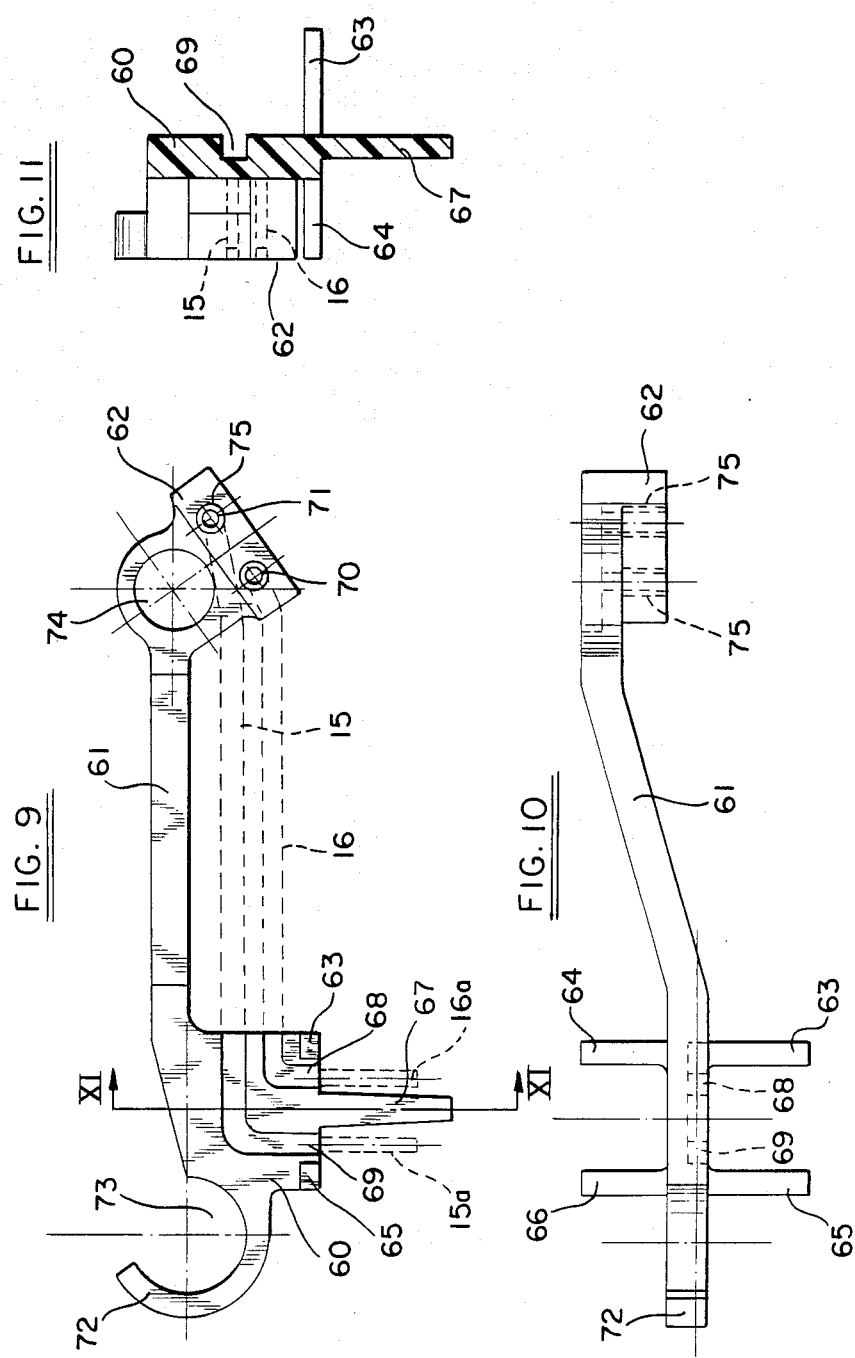

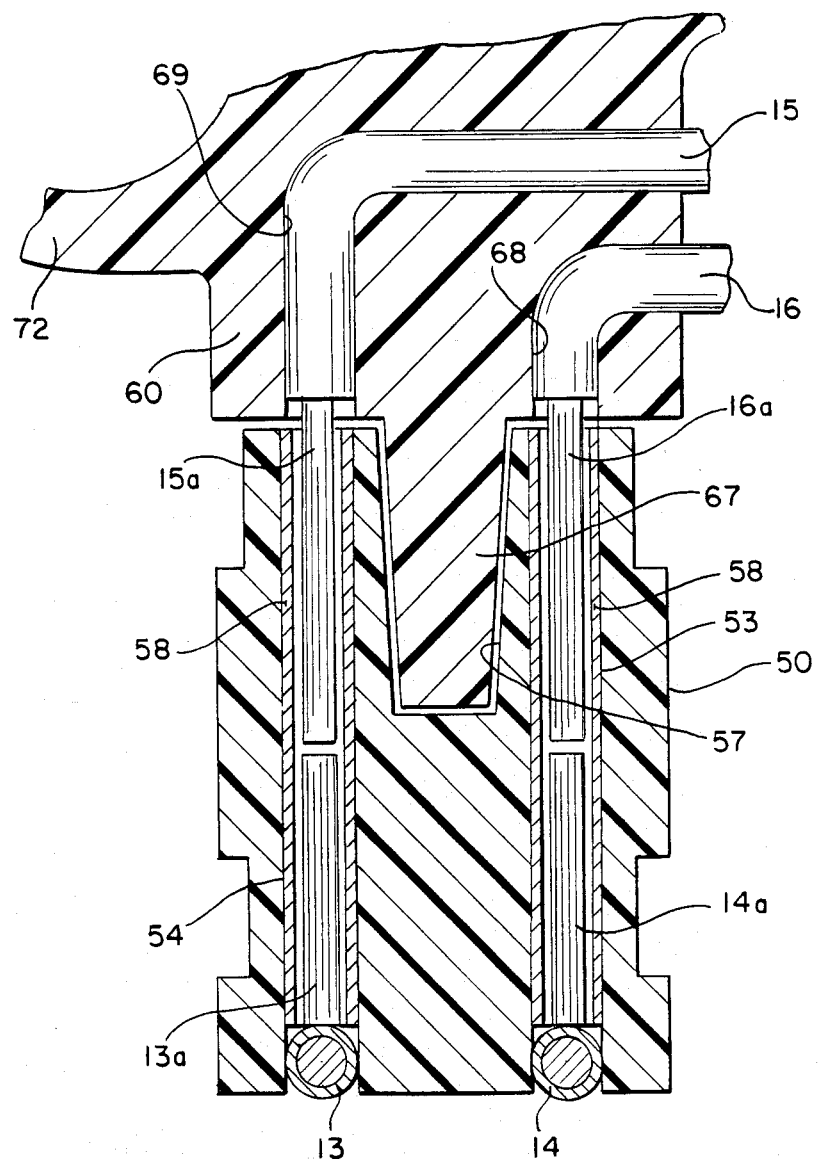

WIRING ARRANGEMENT FOR AN ELECTRIC TOOL

FIELD OF THE INVENTION

This invention relates to wiring arrangements for electric devices, particularly electric tools, and relates to both the method of assembling and wiring such electric devices and to the wired and assembled electric devices themselves.

BACKGROUND OF THE INVENTION

Over the years, many problems have been encountered in attempting to automate the mechanical assembly of electric devices, particularly electric tools provided with electric motors. Although some of the difficulties in such mechanical assembly have been overcome, for example in the production of electric motors and the insertion of these motors in housing shells of portable power tools, a problem that has remained is the completion of the wiring of these tools. The use of printed circuit boards has reduced this wiring problem in some instances, so also has the proposal to employ a plug connection from a printed circuit board to the windings of the electric motor as disclosed in Swiss Pat. No. 568,679.

However, some manual operations in completing the wiring are still essential. For example, the use of a plug connection, although simplifying assembly, still requires the plugging to be performed by hand, as also necessary soldering connections have to be made by hand.

Moreover, the use of printed circuit boards does have the disadvantage, particularly when comparatively large electric currents are involved, that wide conductor paths are necessary. These wide conductor paths not only increase the cost of manufacture of the printed circuit boards, but also result in space and insulation problems.

Another problem that arises in assembly of portable electric tools, is the positioning of the conductor wires in the tool's housing. Such conductor wires, particularly the motor supply wires, are multi-stranded so as to be readily pliable to enable an assembly operator to readily bend and position the wires in the tool's housing during and after insertion therein. Usually the cross-sectional area of these multi-stranded wires is less than 1 square millimeter.

SUMMARY OF THE INVENTION

It is an object of the present invention to provide a wiring arrangement for and a method of wiring electric devices which employ direct plug connections between the wire conductors themselves and/or between the wire conductors and one or more components of the electric devices, and which direct plug connections can be effected mechanically.

A feature by which this is achieved is to engage and support the end portions of the conductor wires in bores and/or grooves in carrier elements, with at least some bared ends of the conductor wires protruding from the carrier elements. This provides the advantage that, with the aid of the carrier elements, these protruding bared ends can be directly plugged into another carrier element or a component of the electric device. With this feature, mechanical wiring of the electric device becomes possible.

It is another object of the present invention to provide a method of wiring electric devices whereby the conductor wires do not have to be manually positioned and shaped in the housing of the electric device during and after insertion therein.

A feature by which this object is achieved is to employ relatively stiff conductor wires, particularly conductor wires having a single solid conductor core, and to preform the conductor wires to their final configuration before inserting them in the device's housing. The conductor wires have a stiffness sufficient to enable these preformed configurations to be maintained during handling and assembly operations. Thus, manually shaping of the wires can be eliminated, and the employment of the above carrier elements enables the preformed conductor wires to be mechanically placed in position. Also, these stiff conductor wires enable the bared ends thereof to perform excellently as plug pins.

Therefore, according to the present invention there is provided a method of wiring an electric device, particularly an electric tool, characterized by the steps of engaging conductor wires adjacent the ends thereof in bores and/or grooves provided in carrier elements with bared ends of at least some of the conductor wires protruding from the carrier elements, inserting the carrier elements with the conductor wires engaged therein into at least part of the housing of the electric device, and electrically connecting the conductor wires by plugging carrier elements together and/or to an electrical component of the electric device, with the protruding bared wire ends functioning as plug pins.

Preferably, the conductor wires are relatively stiff, and are pre-formed into the configuration to be occupied thereby when assembled in the electric device before the conductor wires are inserted into the housing of the device. Preferably the conductor wires are provided with an insulating outer covering or coating.

The pre-forming step preferably occurs before the conductor wires are engaged in the carrier elements. However, the conductor wires may be partially or completely pre-formed to their final configuration after being engaged partially or fully in the carrier members.

Two or more carrier elements, with conductor wires accommodated therein, may be plugged together before or after insertion into the housing of the device. Also, a carrier element can be plugged to a component of the device, for example a stator assembly of an electric motor, for electrical connection thereto of conductor wires, and this carrier element and the component inserted in the housing as a unit.

The employment of the carrier elements enables the ends of the conductor wires, to be electrically connected, to be situated at defined sites, which is not the case when trying to connect "free" conductor wire terminals. This contributes to enabling the plug connections to be made mechanically in a very simple manner.

Also, the employment of pre-shaped rigid conductor wires enables the carrier elements and accompanying conductor wires to be inserted into the device's housing and extend into the desired housing areas without requiring subsequent manual adjustment.

There is also provided according to the invention an electric device, particularly an electric tool, having carrier elements located in the device's housing with these carrier elements having bores and/or grooves accommodating end portions of conductor wires, the ends of the conductor wires being bared with some of these bared ends protruding from at least one of the carrier elements, and each carrier element being connected to another carrier element or to an electrical component of the device by plug connections, the protruding bared ends functioning as plug pins.

At least some of the carrier elements may be held positively in the device's housing, so that the position of the carrier elements as well as the conductor wires is determined by the shape of the housing and cannot change.

To precisely position the bared terminal ends of the conductor wires, a carrier element may have insertion grooves therein communicating with bores; a portion of each conductor wire adjacent such a bared terminal end can be accommodated in an insertion groove with the bared terminal end extending into or through a communicating bore. In such an insertion groove, it is possible to insert also a choke which is thereby positioned in a simple manner and becomes accessible for interchanging.

If it is desired to interconnect two connections or groups of connections that are at a comparatively large spacing from one another, it is possible to provide a carrier element that has two terminal elements for accommodating the end portions of conductor wires, with these terminal elements being integrally attached to each other in spaced apart relation by an inherently stable rail.

Preferably, a conductor wire is bent at an angle, such as a right angle, adjacent a bared end. A portion of the conductor wire, on the opposite side of such bend to the bared end, may be pressed into a groove or passage in a carrier element. And, another portion of the conductor wire on the other side of the bend, which portion may or may not include the bared end, may be inserted in a bore or passage in the carrier element. If this bared end is to function as a plug pin, then it would protrude from the bore. The groove communicates with the bore in so far as the supported conductor wire passes through the groove into the bore adjacent thereto. The carrier element may have one or more slots therein, and extending outwardly therefrom, to enable pre-shaped conductor wires to be inserted into such slots before being inserted into the grooves and communicating bores.

In the situations where a bared end of a conductor wire does not protrude from a bore, then such bore preferably has a conductive sleeve therein making electrical contact with such bared end. A plug-in connection can be made by plugging a bared end of another conductor wire into the other end of such conductive sleeve.

The bent conductor wire may be pressed into a correspondingly bent groove or passage, with a bared end of the wire extending from both this groove and the carrier element in which it is formed.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings:

FIG. 2 is a plan view of a carrier element substantially as seen attached to the stator in FIG. 1, but rotated through approximately 90° anti-clockwise;

FIG. 3 is a side view of the carrier element taken in the direction of the arrow III in FIG. 2;

FIG. 4 is a section on the line IV—IV of FIG. 2;

FIG. 5 is a section on the line V—V of FIG. 2;

FIG. 6 is a side view of another carrier element shown in FIG. 1;

FIG. 7 is a top plan view of the carrier element of FIG. 6 taken in the direction of the arrow VII in FIG. 6;

FIG. 8 is another side view of the carrier element of FIG. 6 taken at right angles to FIG. 6;

FIG. 9 is a side view of a third carrier element located in the handle housing of FIG. 1;

FIG. 10 is a top plan view of the carrier element of FIG. 9;

FIG. 11 is a section on the line XI—XI of FIG. 9;

FIG. 12 is a fragmentary section on the line XII—XII of FIG. 2 and showing one of the electrical connections and mounting points of the carrier element of FIG. 2 onto the stator in FIG. 1;

FIG. 13 is a fragmentary section showing the carrier element of FIG. 9 connected to the carrier element of FIG. 6 and taken on the section line XIII—XIII of FIG. 7;

FIG. 14 is a partial section illustrating the carrier element of FIG. 6, orientated as in FIG. 1, mounted between both halves of the motor housing;

FIG. 17 is a schematic assembly diagram illustrating the assembly and wiring of the electric motor of FIG. 1 and the insertion thereof into the motor housing.

DETAILED DESCRIPTION OF THE PREFERRED EMBODIMENTS

Figure 1:
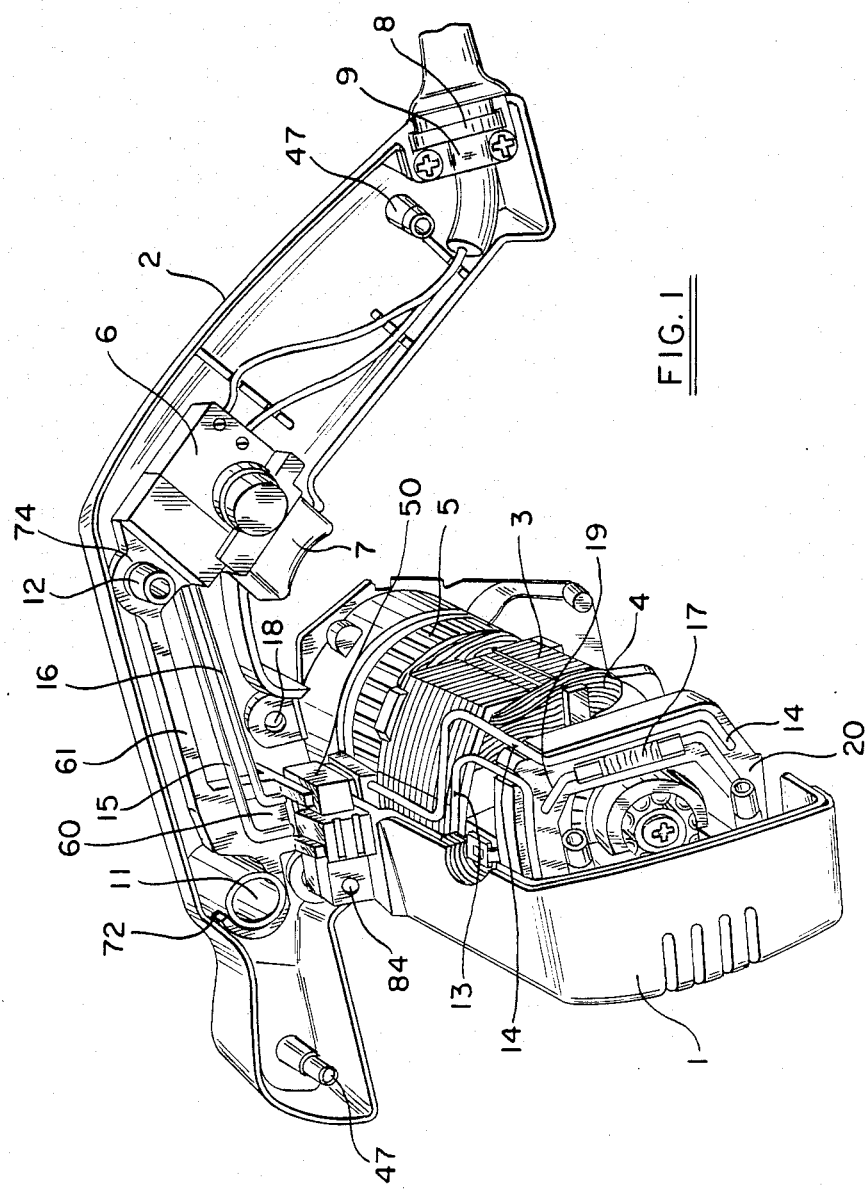
FIG. 1 shows a perspective view of a circular saw according to the invention with one half of the handle housing, one half of the motor housing, the circular saw blade, the saw blade housing, and the saw shoe having been omitted for clarity.

FIG. 1 illustrates a circular saw having a motor housing half shell 1 and a handle half shell 2. The other motor housing half shell and the other handle half shell are similar to those shown, but mirror images thereof. The electric motor mounted in the motor housing half shell 1 has a stator 3 with field coil windings 4, and an air circulation fan 5 mounted on the armature shaft at the opposite end to the commutator thereof. Mounted in the handle half shell 2 is a main switch 6 actuated by a trigger 7. A main electric supply cable 8 enters through the end of the handle half shell 2 and is clamped in position by a clamp 9. Two leads extending from the cable 8 are connected to the switch 6 by screw connections. A carrier element 20, moulded from insulating plastic material, is mounted on the terminal block of the stator 3 and surrounds the commutator of the armature. The carrier element 20 has mounted therein a pair of conductor wires 19 connected between a field coil winding and a motor brush assembly, each conductor wire 19 (only one of which can be seen) carrying a choke 17. A pair of conductor wires 13, 14, are connected between the carrier element 20 and a second carrier element 50 which is also moulded from insulating plastic material. The carrier element 50 is mounted in and supported by a raised portion 10 of the motor housing shell 1. A third carrier element 60, 61 carries two conductor wires 15, 16, the left hand ends of which are plugged into the carrier element 50 and the right hand ends of which are connected to switch 6. The carrier element 60, 61 is mounted on hollow studs 11, 12 projecting inwardly from the handle half shell 2. The studs 11, 12 locate and hold the carrier element 60, 61 in position. The raised portion 10 of the motor housing half shell 1 has a screw hole 84 therethrough, the other motor housing half shell having a similar screw hole therein. The handle half shell 2 has a pair of screw holes 18 (only one of which can be seen) which align with the screw holes 84 and with another pair of screw holes in the other handle half shell. A pair of screws (not shown) are passed through these aligned holes and secured with nuts to secure the handle of the circular saw to the motor housing.

Thus, power is supplied to the motor from the switch 6 through the pair of conductor wires 15, 16 and the pair of conductor wires 13, 14. These are comparatively stiff, solid copper wires having an insulating cover. These copper wires have a rather large cross sectional area of about 1.5 square millimeters. The reason for this large cross sectional area is to make the copper wires comparatively rigid. The ends of each of these wires are bared of insulation and make their electrical connection by being plugged in position similarly to plug pins, this being possible by the rigidity and stiffness of the copper wires. Further, these wires are bent to the final shape they will assume in the electric tool before they are assembled. The stiffness of the copper wires enable them to retain their pre-shaped configuration during subsequent handling and assembly operations. The various carrier elements support and locate these wires at or adjacent their ends, and help the reliable connection of the wires mechanically in their correct positions in the electrical tool. In addition, and most important, the carrier elements in combination with the rigidity of the wires provide the means by which the electric tool can be wired by automation. These carrier elements will now be described individually in greater detail.

FIG. 2 shows the carrier element 20, absent the conductor wires, rotated through approximately 90° counter-clockwise from the position shown in FIG. 1. This carrier element has a large central opening 21 through which, when assembled, the commutator of the armature extends, the commutator 41 and the motor brushes 42 being shown in broken lines. A groove 29a, for the insertion of the conductor wire 14, communicates at one end with an outwardly facing slot 29 and at the other end with a bore 24 which extends downwardly through a lug 22 (shown in broken lines) extending downwardly from the carrier element. Another groove 31, for the conductor wire 13, communicates with an outwardly extending slot 28 at one end, and a bore 27 at the other end extending downwardly through a lug 23a (shown in broken lines). On opposite sides of the carrier 20, and extending into the central opening 21, are a pair of brush holder housings 40. Each housing 40 has a outwardly extending slot 33, 34, respectively, in its upper wall and extending from about the middle of the length of the housing to its outer end. The slot 34 passes through the groove 31. Shown in broken lines are the positions of electrical connection sockets 35, 36 of the brush holders when located in the housings 40. A groove 30, for the conductor wire 19, communicates at one end with a bore 26 extending downwardly through a lug 33 (shown in broken lines), and at the other end with the inner end of the slot 33. An intermeidate portion of this groove is formed as an enlarged cavity 30a to accommodate the choke 17. A fourth groove, for another conductor wire 19, communicates at one end with the inner end of the slot 34, and at the other end with a bore 25 extending downwardly through a lug 22a (shown in broken lines). The intermediate portion of this groove 32 is also formed with an enlarged cavity 32a to accommodate the other choke.

FIG. 3 is a side view of the carrier element 20 in the direction of the arrow III in FIG. 2. The lugs 22 and 23 can be seen extending from the base of the carrier element, and the bores 24 and 26 therethrough are shown in broken lines. At the outer end of the bore 24 is a recess 83, and to one side of the outer portion of the bore 24 is an enlarged cavity 82, all shown in broken lines. Each of the other lugs 23, 22a and 23a have similar outer recesses and offset enlarged cavities, the function of which will be more fully described later. FIG. 4 is a section on the line IV—IV of FIG. 2 and shows a brush holder housing 40 positioned between the lugs 23, 23a. The housing 40 defines a space 37 for a brush holder and has a large slot on the right hand side defined by projections 38 and 39. The groove 29a and the enlarged cavities 30a and 32a can be seen.

FIG. 5 is a section on the line V—V of FIG. 2 and shows the slot 34 communicating with the groove 32 and with the brush holder space 37. The recesses 83 can be more clearly seen in the outer ends of the lugs 23, 23a.

FIGS. 6, 7 and 8 show the carrier element 50. FIG. 6 approximates to the orientation of the carrier element 50 in FIG. 1, and shows two grooves 51, 52 in the bottom of the carrier element 50 to accommodate therein the conductor wires 14, 13, respectively, adjacent their ends. The grooves 51, 52, communicate with upwardly extending bores 53, 54 shown in broken lines. In the upper part of the carrier element 50, between the bores 53, 54, is a cavity 57 shown in broken lines. The carrier element 50 has a channel 55 just above its base, and an upwardly projecting reduced portion 56 at its top. FIG. 7 shows in plan view the bores 53, 54, and the cavity 57 therebetween extending downwardly in the reduced portion 56. The channels 51, 52 are shown in broken lines. FIG. 8 is another side view of the carrier element 50, at right angles to the view shown in FIG. 6, and showing the upward projection 56 and the channel 55.

FIGS. 9, 10 and 11 show the third carrier element which is located in the handle of the electric tool. This carrier element has three parts as best seen in FIG. 9, namely, a terminal body 60 at one end, a terminal body 62 at the other end, with these two terminal bodies being intrinsically interconnected by a substantially inherently stable rail 61. In the terminal body 60 are disposed bent grooves 68 and 69 from between which downwardly projects a plug-in location pin 67. In the terminal body 62 there are bores 70 and 71 in which are inserted brass sleeves 75. The conductor wires 15, 16 (shown in broken lines) are inserted at one end in the grooves 69, 68 with the bared ends 15a, 16a of the conductor wires 15, 16 extending downwardly on each side of the plug-in location pin 67 for part of the length thereof, as shown in broken lines. The wires 15, 16 extend under the rail 61 with their other bared ends inserted partway into the brass sleeves 75 in the bores 71, 70, respectively. The rail 61 is enlarged adjacent the terminal end 62 and this enlarged portion defines a hole 74. At the opposite end of this carrier element, an upwardly curved hook 72 projects from the terminal end 60, this hook 72 defining a space 73. When this carrier element 60, 61, 62 is assembled as in FIG. 1, the studs 11 and 12 engage through the space 73 and hole 74, respectively, to accurately locate and hold this carrier element into position. From the bottom of the terminal end 60 extend on each side a pair of cross bars 63, 65 and 64, 66, respectively, as can best be seen in FIG. 10. FIG. 11 is a section on the line XI—XI of FIG. 9 and shows the groove 69 in the terminal end 60 with cross bars 63 and 64 extending on opposite sides thereof. The location pin 67 can be seen extending downwardly from one side of the terminal end 60. In FIG. 11 the conductor wires 15, 16, shown in broken lines, can be seen extending to the left hand side, that is to the rear of, the terminal end 62, at which location they enter the brass sleeves 75.

FIG. 12 shows on an enlarged scale a fragmentary section on the line XII—XII of FIG. 2 of the carrier element 20 when mounted on the stator, as in FIG. 1. The end of the stator has a terminal block 3a of insulating plastic material as is well known in the art. This terminal block 3a has extending outwardly therefrom four terminal sockets, one 79 of which is shown. Extending through the center portion of the terminal block 3a, and terminating adjacent the socket 79, is a terminal end 81 of one of the field windings, shown in broken lines for clarity. The recess 83 is the outer end of the lug 22 of the carrier element 20 locates over the outer end of the socket 79. In the socket 79 is tightly located a female terminal connector 78 having a tang 80 projecting at an angle outwardly therefrom. The terminal end 81 of the field coil winding is crimped in the metal tang 80 to make good electrical contact therewith. The outwardly projecting tang 80 is accommodated by the enlarged cavity 82 to one side of the end of the bore 24 through the lug 22. The bared end 77 of the connector wire 14 protrudes outwardly from the end of the bore 24 and is inserted as a tight plug-in fit in the female terminal connector 78 to make electrical contact therewith. The insulating cover of the wire 14 is shown at 76. The other three lugs 22a, 23 and 23a of the carrier element 20 similarly fit over the other three sockets of the terminal block 3a, with the bared end of the conductor wires passing through these lugs being similarly plugged-in to female terminal connectors. The recesses 83 serve to locate the respective lugs on the terminal block sockets, but the physical attachment of the carrier element 20 to the terminal block 3a is effected by the bared ends of the conductor wires tightly engaging in the female terminal connectors. It will be appreciated that it is possible to achieve this by the rigidity of the heavier than normal gauge copper wire 77. Thus, the bared ends of these relatively rigid or stiff conductor wires serve two functions, namely to effect plug-in electrical connections, and to physically secure the carrier element in position.

FIG. 13 shows in section and on an enlarged scale the terminal end 60 of the carrier element in the handle of the electrical tool connected to the carrier element 50 when assembled as in FIG. 1. Inserted as a press fit in the bores 53, 54 of the carrier element 50 are brass sleeves 58. The bared ends 13a, 14a of the conductor wires 13, 14, respectively, extend upwardly half way through the sleeves 54, 53 as a tight fit therein. The relatively stiff wires 13, 14 make both electrical contact with the sleeves 54, 53, respectively, and support the carrier element 50. The location pin 67 of the terminal end 60 locates in the recess 57 and the bared ends 15a, 16a of the conductor wires 15, 16 are inserted downwardly in the upper half of the brass sleeves 58 as a tight fit therein. During assembly of the terminal end 60 onto the carrier element 50, the location pin 67 first enters the cavity 57 and thereafter the bared ends 15a and 16a start to plug-in to the brass sleeves 58. As can be seen, the location pin 67 is tapered and its function is to locate the terminal end 60 of the handle carrier element accurately relative to the carrier element 50. The physical attachment of these two carrier elements is effected by the tight plug-in fit of the relatively rigid wires 15, 16 into the sleeves 58.

FIG. 14 shows the manner in which the carrier element 50 is mounted and located in the motor housing of the electrical tool. The raised portion 10 of the motor housing half shell 1 has inwardly extending upper and lower lips 59 which engage respectively adjacent the upward projection 56 and into the channel 55. Similarly, the other motor housing half shell 1a has a raised portion 10a having a pair of inwardly projecting lips 59a which also engage respectively adjacent the upward projection 56 and in the groove 55. FIG. 14 also shows both the screw holes 84 and 85 by which the handle housing is attached to the assembled motor housing.

Figure 16:
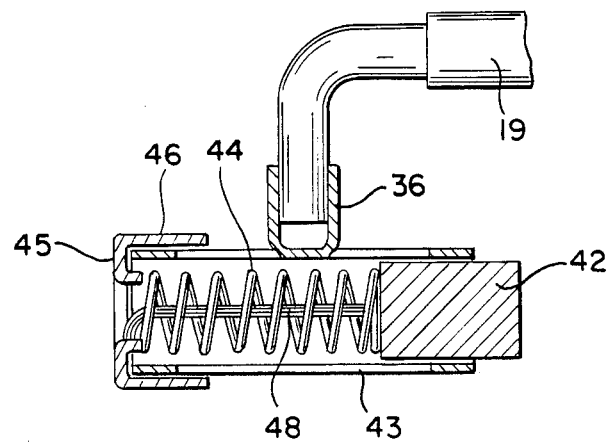
FIG. 16 is a section on the line XVI—XVI of FIG. 15 and also showing a conductor wire attached.
Figure 15:
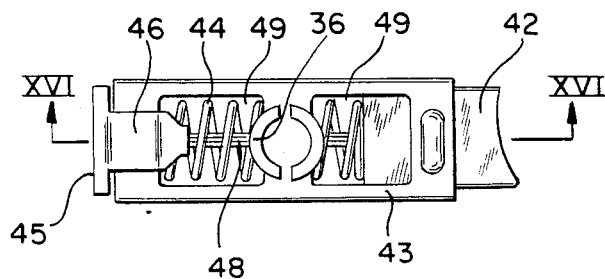
FIG. 15 is a plan view of a motor brush assembly.

FIG. 15 shows a plan view of the brush assembly that becomes located in the left hand brush holder housing 40 of the carrier element 20 as orientated in FIG. 2. The brush holder is a brass tubular housing of rectangular cross section and having two windows 49 in one side thereof. A carbon brush 42 is slidably located in one end of the housing 43, and a metal cap 45 is clipped over the other end of the housing 43 and retained in position by a pair of bent-over tabs 46. A multi-strand brush wire 48 is connected at one end to the brush 42 and at the other end to the metal cap 45. A spring 44 is compressed between the cap 45 and the end of the brush 42 for urging the brush 42 against the commutator as is well known in the art. A female connection socket 36 extends outwardly from the middle of the brush box 43. FIG. 16 is a section of the brush assembly on the line XVI—XVI of FIG. 15, and also shows the bared end of the conductor wire 19 plugged directly into the socket 36, so effecting electrical connection between the wire 19 and the carbon brush 42.

The method of assembling and wiring the electric tool will now be described in greater detail with particular reference to FIG. 17.

As illustrated in FIG. 17, at the assembly station A the carrier element 20, a pair of wire clips 87, a pair of brush boxes 43, and a pair of brushes 42 with preassembled caps 45 and springs 44 are placed in order on a conveyor. These parts are moved to assembly station B where the brush boxes 43 are inserted from the outside inwardly into the brush holder housings 40 of the conductor element 20, and the brush units 42, 44, 45 are inserted into the brush boxes with the tabs 46 of the caps 45 securing the brush units in position. The clips 87 are temporarily assembled to hold the brushes 42 in the brush boxes 43 against the action of the springs 44. This unit is then moved onto a rotating annular table 102 at mechanical assembly station C, together with a pair of conductor wires 19 with pre-assembled chokes, and conductor wires 13, 14. The conductor wires 19, 13 and 14 have been previously bent to the exact shape they will occupy when the electric tool is fully assembled. These conductor wires are pre-shaped three dimensionally, and due to the comparative rigidness of the heavy gauge copper wire, they retain their pre-formed configuration during subsequent mechanical handling and assembly. As the table 102 rotates in the direction of the arrow, the four pre-shaped conductor wires are mechanically assembled into the conductor element unit 20. In this respect it should be noted that the outwardly extending slots 29, 28 (see FIG. 2) of the carrier element 20 enable the three dimensionally shaped wires 13, 14 to be first inserted sideways into the slots, and then pulled down into their respective grooves 31 and 29a with a bared end of the wire 13 engaging and passing into the bore 27, and a bared end of the wire 14 engaging in the bore 24. As can be seen in FIG. 17, the conductor wires 13, 14 each have one bared end which is longer than the other bared end. It is the longer bared ends that are inserted respectively into the bores 27 and 24. At assembly station D on the table 102 are positioned a pair of brass sleeves 58 and a carrier member 50. At station D the sleeves 58 are pressed into the bores 53 and 54 in the carrier element 50. At assembly station E, as the table 102 continues to rotate, the carrier element 50 is mounted on the free ends of the conductor wires 13, 14 with the shorter bared ends of these wires being inserted in the sleeves 58 and the wires 13, 14 engaging respectively in the grooves 52, 51—as shown in FIG. 13. Previously, the smaller bared ends of the pair of conductor wire assemblies 19 had been plugged into the sockets 36 on the two brush boxes 43.

At station E the mechanical sub-assembled unit comprising the carrier element 20 and the carrier element 50 is orientated onto one edge as shown. As the table 102 continues to rotate, this sub-assembled unit reaches station F and is rotated anti-clockwise through 90° to the orientation shown, before being ejected from the table 102 in the direction of the arrow. At the same time, as this sub-assembly is being assembled around the table 102, a continuous stream of stator assemblies 3 with attached terminal blocks 3a are moved on a conveyor through station G from a stator assembly line, the stators approaching station F from the right in FIG. 17. Simultaneously, a continous stream of armature assemblies 89 and gear units 90 are approaching station F from the left in FIG. 17. At assembly station I an armature 89 is aligned above a gear unit 90 with the commutator of the armature uppermost. As the aligned armature and gear unit arrive at station J, the armature is inserted into the gear unit. As this sub-assembly reaches station K, an armature shaft bearing 91 is inserted on the commutator end of the armature shaft. At this point in the assembly, the sub-assembly of the carrier units 20, 50 at station F is inserted over the terminal block 3a of the stator 3 positioned opposite station F. During this operation, the bared ends of the conductor wires 13, 14 and 19, extending through the four lugs 22, 22a, 23, 23a of the carrier element 20, are plugged into the four female terminal connectors in the terminal block 3a to electrically connect this sub-assembly to the stator and mechanically attach it thereto. This stator 3 with the assembled carrier element 20 is now inserted over the armature of the sub-assembly at station K to complete the assembly of an electric motor with gearing unit. This motor assembly is then moved to station L where it is inserted in the motor casing half shell 1, with the carrier element 50 slidably engaging in the projecting housing portion 10. Due to the pre-shaping of the wires 13, 14 and their relative stiffness, the wires 13, 14 hold the carrier element 50 in the correct position to engage in the housing portion 10 without manual interference or further bending or positioning of the wires 13, 14. Also at station L the other motor housing shell 1a is introduced together with the four screws 100 ready for insertion in the four screw holes 101 of the shell 1a. On moving into station M, the motor housing shell 1a is presented to the motor housing sheet 1 and secured thereto by the screws 100.

At a separate assembly location a supply cable 8 is introduced through the end of a handle housing half shell 2 and secured thereto by the clamp 9. The two leads from the cable 8 are then manually secured to a switch unit 6. A carrier element 60, 61, 62, with preformed wires 15, 16 mechanically pre-inserted therein, is positioned in the handle half shell 2 with the studs 11, 12 engaging through the opening 73 and hole 74, respectively. The switch 6, which has extending therefrom a pair of bared heavy gauge copper wires, is then plugged onto the terminal end 62 with these bared copper wires plugging into the ends of the brass sleeves 75 in the terminal end 62. This plug-in connection not only forms an electrical connection, but also positions and supports the switch 6. The other handle half shell is then matched to the handle half shell 2, and secured thereto by screws passing through the screw holes 47 in the handle shell 2 and corresponding screw holes in the other handle half shell. This completes assembly of the handle of the electric tool. With this assembled handle there is an aperture in register with the terminal end 60, and through which aperture the location pin 67 and the bared wire ends 15a and 16a (see FIG. 9) are accessible. This handle assembly is then brought to an assembly station adjacent station M in FIG. 17, and the aperture in the handle located over the motor housing projecting portions 10, 10a (see FIG. 14). Upon engagement, the locating pin 67 of the terminal end 60 locates in the cavity 57 in the carrier element 50, and the bared ends 15a, 16a of the conductor wires 15, 16 are plugged into the carrier element 50 as shown in FIG. 13. Screws are then inserted through the holes 18 in the handle and the holes 84, 85 in the projecting portion of the motor housing to secure the handle to the motor housing assembly. At this stage, all the electrical connections in the electric tool are completed and have been made mechanically with the exception of the connection of the cable 8 to the switch 6. The saw blade housing (not shown) is now connected to the gear unit end of the motor housing, and then the remaining items of the circular saw attached, such as the support shoe and the circular saw blade.

To the left in FIG. 17 is shown a buffer area H in which a stator unit 3 is located. This buffer area is used to balance the production rate from the rotary table 102 and the stator assembly line.

It will be appreciated from the above, that the present invention enables portable power tools, such as circular saws, drills, planers, sanders etc., to be virtually completely mechanically assembled. This is made possible by the use of heavy gauge, solid core wire having bared ends for plug-in connection, and the location of these relatively rigid wires adjacent their ends in carrier elements which can be inserted in the tool's housing.

The above described embodiments, of course, are not to be construed as limiting the breadth of the present invention. Modifications, and other alternative constructions, will be apparent which are within the spirit and scope of the invention as defined in the appended claims.

For example, the carrier element 20 could have the brush holder housings 40 arranged so that the brush holders are inserted from the central opening 20, that is from inside the carrier element 20, instead of from outside. Further, the carrier element 20 could be provided with additional slots like the slots 28 and 29, and also possibly with additional grooves, to accommodate additional conductor wires as may be particularly necessary in electronically controlled power tools and machines.

Although the plug-in copper conductors in the above embodiment have a cross sectional area of about 1.5 square millimeters, this cross section can be varied depending upon the specific requirements. For example, this cross sectional area could be in the range of 1 square millimeter to 5 square millimeters. The lower limit of such range is determined by two requirements, namely, sufficient stability of the pre-formed wires to retain their shape and be self-supporting, and sufficient stability of the bared wire ends so that they can be used as plug pins. In this respect it should be noted that a feature of the present invention is the use of wires for two purposes, namely as electrical conductors and as plug pins.

Further, the trigger switch may be pre-assembled to the main supply cable before insertion into the handle housing shell, the end of this shell being provided with a slotted opening to accommodate this. Also, the trigger switch could be provided with conductive sockets into which are plugged bare ends of the conductor wires 15, 16 then extending from the bores in the terminal element 62. Preferably, when making any of the plug-in connections, a part having protruding conductor bare ends is positioned in alignment with and then moved towards a part having conductive sockets therein. Of course, it is possible for a carrier element to have both a conductive socket therein and a protruding bare conductor wire end.

What is claimed is:

1. A method of assembling an electric device, comprising the steps of:
   forming individual lengths of stiff conductor wires into configurations that are to be occupied by said conductor wires throughout said lengths in the device when the device is finally assembled;
   engaging firmly the conductor wires adjacent ends of the conductor wires in carrier elements of insulating material with said conductor wires passing through at least parts of said carrier elements, the ends of the conductor wires being bare, and at least some of the bare ends protruding from at least one of said carrier elements;
   inserting the carrier elements, with the conductor wires engaged in the carrier elements and occupying said configurations, into at least one housing part of the device;
   said conductor wires having a stiffness which effects self-supporting maintenance of said configurations during said inserting step; and
   electrically interconnecting at least some of said conductor wires by plugging together two of said carrier elements, with at least some of the protruding bare ends functioning as plug pins.

2. The method of claim 1, comprising plugging all of said bare ends directly into conductive sockets to effect electrical connection of said conductor wires.

3. The method of claim 1, wherein said forming step is completed before said engaging step.

4. The method of claim 1, wherein there is a third carrier element, said third carrier element having grooves and bores therein and an opening through its center to accommodate a commutator of an armature of an electric motor, and said engaging step includes engaging two of said conductor wires in said third carrier element by pressing said two conductor wires into said grooves and inserting said two conductor wires through said bores with bare ends of said two conductor wires extending from said bores; and further comprising the step of attaching said third carrier element to a stator assembly of said electric motor by plugging the bare tends extending from said bores into field winding terminal connectors in said stator assembly.

5. The method of claim 4, wherein said inserting step includes inserting two further conductor wires in said third carrier element with bare ends of said two further conductor wires extending from two further bores in said third carrier element, and said attaching step includes plugging the extending bare ends of said two further conductor wires into two further field winding terminal connectors in said stator assembly.

6. The method of claim 1, wherein said engaging step includes engaging at least one of said conductor wires adjacent both ends of said at least one of said conductor wires in spaced apart terminal end parts of an elongated carrier element.

7. The method of claim 1, wherein said inserting step comprises inserting said two said carrier elements in different and separated housing parts of the tool, and said electrically interconnecting step is effected by assembling and separated housing parts together.

8. A method of wiring an electric device, comprising the steps of:
   pre-forming insulated stiff conductor wires, each having a single solid copper core with a cross-sectional area between one to five square millimeters, into final configurations that said wires will entirely occupy when assembled in the electric device;
   press fitting said wires adjacent ends of said wires into grooves provided in carrier elements with bared ends of at least some of said wires protruding from said carrier elements;
   inserting said carrier elements with said wires engaged in said carrier elements into at least part of a housing of the electric device;
   electrically connecting said conductor wires in the electric device by plugging at least two of said carrier elements together and plugging another of said carrier elements to an electrical component of the electric device with the protruding bared wire ends functioning as plug pins; and
   said pre-formed wires having a stiffness which maintains said final configurations in a self-supporting manner during said inserting and electrically connecting steps.

9. The method of claim 8, wherein said inserting step includes engaging at least some of said carrier elements with location elements in the housing of the electric device to locate and hold said at least some carrier elements positively in position in the electric device.

10. A method of assembling an electric device, comprising the steps of:
    pre-forming a rigid conductor wire having an insulating outer covering into a three dimensional configuration that is to be occupied by said conductor wire in the electric device when the device is assembled, the pre-formed conductor wire being self-supporting in this pre-formed configuration and retaining said pre-formed configuration during subsequent assembly due to being rigid;
    baring opposite ends of said rigid conductor wire by removing the insulating outer covering from said rigid conductor wire to produce bared ends;

engaging the conductor wire adjacent said bared ends in carrier elements of insulating material with one of said bared ends protruding from one of said carrier elements and said conductor wire passing through at least part of each carrier element;

placing said carrier elements with said conductor wire engaged therein in a housing part of the electric device with the conductor wire maintaining said pre-formed configuration which extends from said one of said bared ends to the opposite bared end of said conductor wire; and effecting electrical connection of said conductor wire to a component of the electric device by plugging said one carrier element and said component together with said one bared end functioning as a plug pin and being directly plugged into a socket in said component.

11. The method of claim 10, wherein said engaging step is performed before said pre-forming step.

12. The method of claim 10, wherein said carrier element has a groove, and said engaging step comprises inserting said conductor wire into said groove.

13. The method of claim 12, wherein said conductor wire is inserted as a press fit in said groove.

14. The method of claim 12, wherein said carrier element has a bore adjacent said groove, said pre-forming step includes forming a bend in said conductor wire adjacent said bare end, and said engaging step includes inserting said bare end through said bore.

15. A method of wiring an electric device having a motor, comprising the steps of:

forming stiff conductor wires into configurations to be occupied by said stiff conductor wires in the device when the device is finally assembled, the individual conductor wires having a rigidity which retains said configurations in a self-supporting manner during and after assembly of the device;

engaging said conductor wires adjacent ends of sad conductor wires in carrier elements, said ends of the conductor wires being bare, and at least some of the bare ends protruding from at least some of said carrier elements;

said engaging step including pressing two of said conductor wires adjacent ends of said conductor wires into grooves in one of said carrier elements and inserting said two conductor wires through bores in said one carrier element with bare ends of said two conductor wires extending from said bores;

plugging said one carrier element onto an end of a stator assembly with the protruding bare ends of said two conductor wires functioning as plug pins and plugging into field winding terminal connectors in said stator assembly;

inserting an armature into said stator assembly and through a central opening in said one carrier element;

inserting said carrier elements with said conductor wires engaged in said carrier elements, including said one carrier element plugged into said stator assembly, into at least part of a housing of the device, and positioning said carrier elements in the housing whereby said conductor wires are automatically positioned; and electrically interconnecting at least some of said conductor wires by plugging together two of said carrier elements with at least some of said protruding bare ends functioning as plug pins.

16. The method of claim 15, wherein:

said conductor wires are formed into said configurations before being engaged in said carrier elements;

said engaging step further includes inserting said two conductor wires in slots in said one carrier element and positioning said bare ends of said two conductor wires in alignment with said bores before pressing said two conductor wires into said grooves;

said engaging step also includes pressing a further two of said conductor wires into further grooves in said one carrier element with two bare ends of said further two conductor wires extending through two further bores in said one carrier element;

said plugging said one carrier element onto said stator assembly includes plugging said two bare ends of said further two conductor wires into further field winding terminal connectors in said stator assembly;

said engaging step further including plugging other bare ends of said further two conductors wires into sockets of brush boxes mounted in said one carrier element; and said positioning said carrier elements includes engaging at least some of said carrier elements with formations on said housing.

* * * * *